(12) United States Patent
Wang et al.

(10) Patent No.: US 11,546,299 B2
(45) Date of Patent: Jan. 3, 2023

(54) APPLICATION BASED FIREWALL RULE SERVICE

(71) Applicant: VMware, Inc., Palo Alto, CA (US)

(72) Inventors: Nan Wang, Beijing (CN); YiSan Zhao, Beijing (CN); Shengbo Teng, Beijing (CN); Wen Wang, Beijing (CN); Peter Zhang, Beijing (CN)

(73) Assignee: VMware, Inc., Palo Alto, CA (US)

( * ) Notice: Subject to any disclaimer, the term of this patent is extended or adjusted under 35 U.S.C. 154(b) by 1245 days.

(21) Appl. No.: 15/617,136

(22) Filed: Jun. 8, 2017

(65) Prior Publication Data

US 2018/0359217 A1 Dec. 13, 2018

(51) Int. Cl.

| | |
|---|---|
| *G06F 9/00* | (2006.01) |
| *G06F 15/16* | (2006.01) |
| *G06F 17/00* | (2019.01) |
| *H04L 9/40* | (2022.01) |
| *G06F 21/44* | (2013.01) |
| *G06F 9/455* | (2018.01) |
| *G06F 21/53* | (2013.01) |

(52) U.S. Cl.
CPC ...... *H04L 63/0263* (2013.01); *G06F 9/45558* (2013.01); *G06F 21/44* (2013.01); *G06F 21/53* (2013.01); *G06F 2009/45579* (2013.01); *G06F 2009/45587* (2013.01); *G06F 2009/45595* (2013.01)

(58) Field of Classification Search
CPC . H04L 63/0263; G06F 21/53; G06F 9/45558; G06F 21/44; G06F 2009/45579; G06F 2009/45595; G06F 2009/45587; G06F 9/45533; G06F 11/301
See application file for complete search history.

(56) References Cited

U.S. PATENT DOCUMENTS

| | | | |
|---|---|---|---|
| 9,864,874 B1* | 1/2018 | Shanbhag | G06F 21/6218 |
| 2013/0074066 A1* | 3/2013 | Sanzgiri | H04L 49/70 |
| | | | 718/1 |
| 2014/0245423 A1* | 8/2014 | Lee | H04L 63/0218 |
| | | | 726/12 |
| 2015/0082417 A1* | 3/2015 | Bhagwat | H04L 63/0263 |
| | | | 726/13 |
| 2015/0378624 A1* | 12/2015 | Choudhary | G06F 3/0619 |
| | | | 711/114 |
| 2018/0152417 A1* | 5/2018 | Jain | H04L 63/0263 |

\* cited by examiner

*Primary Examiner* — Amie C. Lin (57) ABSTRACT

Described herein are systems, methods, and software to enhance firewall implementation for virtual machines. In one implementation, a method of managing firewall rules for a virtual machine includes identifying, in the virtual machine, an attach process for one or more applications to the virtual machine. The method further includes identifying one or more firewall rules that correspond to the one or more applications and providing the one or more firewall rules to networking manager for the virtual machine.

16 Claims, 9 Drawing Sheets

| APPLICATIONS 512 | NETWORK ADDRESSES 514 | SERVICES 516 | ACTIONS 518 |
|---|---|---|---|
| APPLICATION A 540 | DESTINATION | SERVICE | ACTION |
| APPLICATION B 541 | DESTINATION | SERVICE | ACTION |
| APPLICATION C 542 | DESTINATION | SERVICE | ACTION |
| APPLICATION D 543 | DESTINATION | SERVICE | ACTION |
| APPLICATION E 544 | DESTINATION | SERVICE | ACTION |

DATA STRUCTURE 500

APPLICATION BASED FIREWALL RULE SERVICE

BACKGROUND

In virtual desktop environments, host computers may execute a plurality of virtual machines that can be accessed as a service by end users for traditional desktop computing tasks. These users may login to the service via end user devices and, in response to the login, be provided with a virtual machine to accomplish desired tasks. Once the user logs out of the service or the virtual machine, the service may allocate the same virtual machine to a new requesting user.

Although this service model allows multiple users to access virtual machines and the applications available thereon, each of the users may require a different set of applications. For example, an engineer of an organization may require a different set of applications than a financial officer of the same organization. To provide the required applications, the service may identify applications required for a user, and mount or attach application volumes to the virtual machine allocated to the user to make the applications executable from the storage volumes. An application volume may be considered a containerized, or virtualized, application stored in a virtual disk. When the virtual disk is attached to the virtual machine, a service running on the virtual machine overlays the containerized application on the native file structure so that the containerized application appears to be natively installed onto the disk of the virtual machine. In some implementations, this attachment process may modify any required registry information of the virtual machine to make the applications executable from the application volumes.

Once the application volumes are attached, the user may execute the applications located in the attached volumes as if the applications were locally installed on the virtual machine. However, although applications may be attached via application volumes, it is often difficult to manage the inbound and outbound network traffic associated with the virtual machine. In particular, because different applications may be attached and made available on a virtual machine based the current requirements of the virtual machine, it is often difficult to configure firewall and network management resources for the particular applications.

OVERVIEW

The technology disclosed herein enhances the management of firewall rules for virtual machines based on applications attached to the virtual machines. In one implementation, a method of managing firewall rules for a virtual machine in a computing environment includes identifying, in the virtual machine, an attach process for one or more applications to the virtual machine. The method further provides, in response to identifying the attach process, identifying one or more firewall rules that correspond to the one or more applications, and providing the one or more firewall rules to a networking manager that is configured to apply the one or more firewall rules for the virtual machine.

BRIEF DESCRIPTION OF THE DRAWINGS

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

DETAILED DESCRIPTION

The various examples disclosed herein provide enhancements for application based network traffic management. In many situations, virtual machines provide a centralized computing platform for one or more end users to access and execute desired applications and operations. To provide each of the end users with the required applications, and prevent access to unnecessary applications, one or more application volumes are made available in the virtual environment that are capable of being attached to the individual virtual machines. These application volumes may include, but are not limited to, virtual machine disks (VMDKs), virtual hard disks (VHDs), or some other virtual disk file capable of storing applications for execution on the virtual machines.

To make the applications available to each individual user, an application attach service may be employed that acts as a volume manager that initiates the attachment of application volumes to the individual virtual machines. For example, a user may, via an end user device, initiate a service login to initiate a virtual computing session. This service login may be accomplished using a dedicated application on the end user device, a web browser interface on the end user device, or any other similar interface on the end user device. Responsive to the service login, the virtual computing service may identify an available virtual machine to allocate to the end user, and initiate a user login process to log the end user into the virtual machine. Additionally, the service may identify one or more storage volumes associated with the user and attach the one or more storage volumes to virtual machine. Once attached and the user is logged into the virtual machine, the user may execute any of the applications from the attached storage volumes. Although this is one example of when storage volumes may be attached to a virtual machine, it should be understood that volumes may be attached by other mechanisms. For example, an administrator of a computing environment may define one or more virtual machines to be allocated a set of applications that are available in one or more storage volumes. Additionally, a process executing inside the virtual machine may request the application service to attach one or more applications via attachable storage volumes.

To attach the storage volumes to the virtual machine, the virtual computing service may initiate a process to mount the volumes to the allocated virtual machine for the end user, and overlay the contents of the volumes to make the one or more applications within the volumes executable by the virtual machine. In some examples, mounting a volume to the virtual machine may include providing an access path and mount point for the volume to the virtual machine, which may comprise an internet protocol (IP) address, a directory name, a file name, or any other path information to access the contents of the particular volume. Once mounted, the contents of the volume may be overlaid within the virtual machine to make the application executable. This overlaying may include modifying registry keys to make the application executable from the attached volume, as well as modifying the file structure to make the application appear as though it has been locally installed. For example, when an application storage volume is attached to a virtual machine, the files and directories for the application may appear in the "C:\Program Files" directory, although the executable file components remain stored in the attached volume.

In some implementations, administrators may manage and perform installation processes to store the applications in the application volumes. These installation processes may extract the necessary files and registry keys from an installer, and store the files and registry key files to an appropriate application storage volume. In some examples, the administrator may define application stacks, or groups of applications that are capable of assignment, and provide these groups of applications in one or more application volumes. For example, a first application group may include productivity applications to be supplied to a first set of end users, and a second application group may include video and image editing software to be provided to a second set of end users. Once the applications are stored within the application volumes, the administrator may define which of the applications or volumes are associated with requesting end users.

Here, in addition to managing the application storage volumes that are available to the virtual machines, a network agent, which may comprise a daemon or process executing on the virtual machine, may identify application attach events for the virtual machine. These attach events occur when application volumes are attached to the virtual machine and the contents are overlaid in the file structure of the virtual machine. In response to identifying the attach event, the network agent may identify one or more firewall rules that correspond to the attached applications. In some implementations, the firewall rules may be stored in the one or more storage volumes with the application components. Thus, when an attach event is detected, the network agent may identify the firewall rules within the attached volumes. Once identified, the firewall rules may be provided to a networking manager, wherein the manager may implement the firewall rules for the virtual machine. This implementation of the firewall rules may occur at the virtual network interface of the virtual machine, or at any other point in the data path of communications for the virtual machine. In some implementations, the networking manager may execute as part of the local hypervisor for the virtual machine that provides that software defined networking functionality, however, it should be understood that the networking manager may execute separately from the local host and capable of managing networks over a plurality of hosts.

In many implementations, each of the firewall rules that are identified for the attached applications may include a network address (destination IP address or uniform resource locator), a service executing on the virtual machine, and a corresponding action for the network address and service. For example, a music application may execute a service that is used to communicate with a management server for the application. Accordingly, a firewall rule may be added to permit the communication with the management server when a music application is attached.

Figure 1:
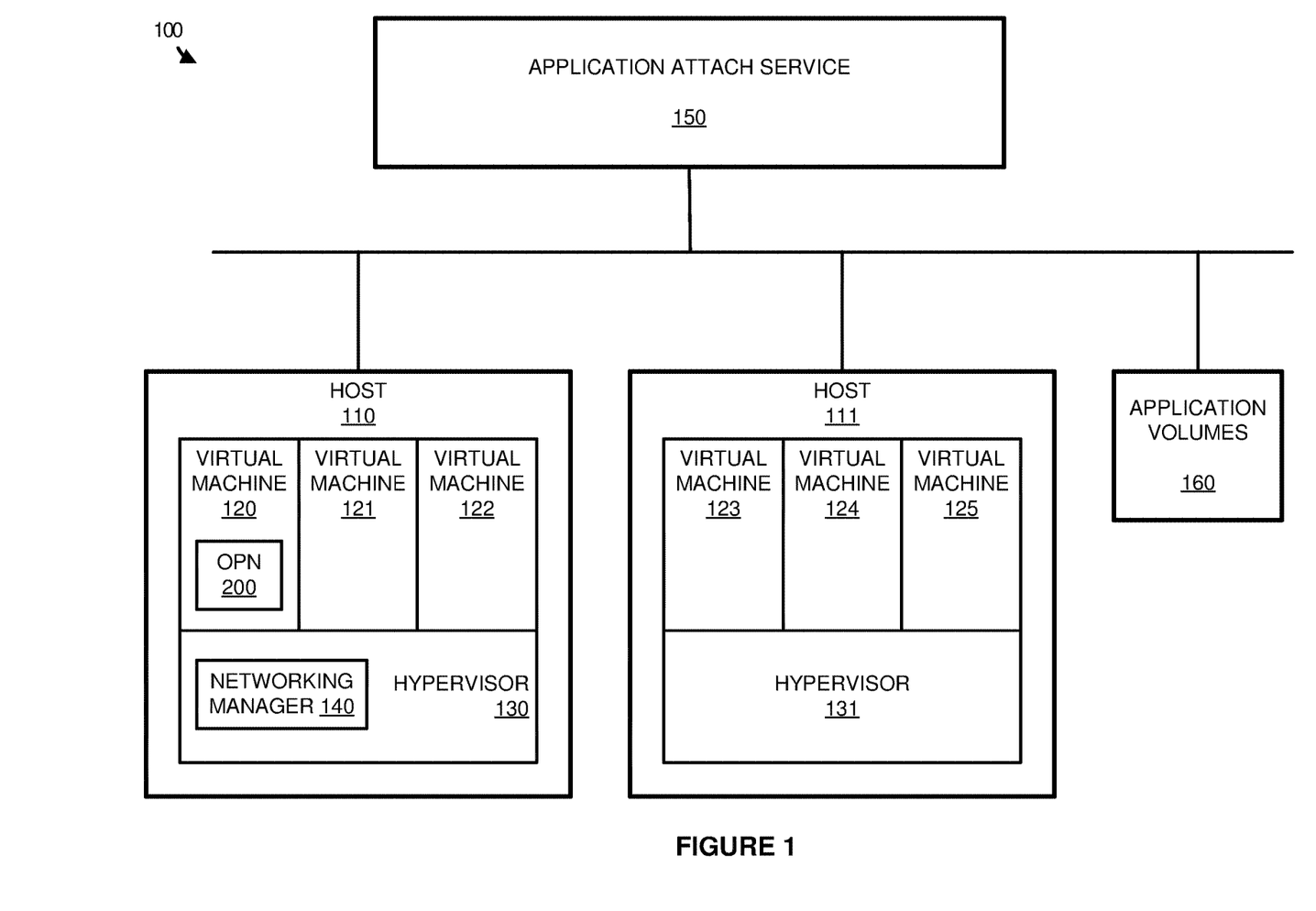
FIG. 1 illustrates a computing environment to implement firewall rules for virtual machines according to an implementation.

FIG. 1 illustrates a computing environment 100 to manage firewall configurations for virtual machines according to an implementation. Computing environment 100 includes application attach service 150, hosts 110-111, and application volumes 160. Application volumes 160 comprise virtual disks that are accessible to hosts 110-111, and may be stored on a serving computer, desktop computer, or some other type of storage device. Although illustrated as separate from hosts 110-111 it should be understood that application volumes 160 may reside wholly or partially on hosts 110-111.

In operation, hosts 110-111 execute hypervisors 130-131 to provide a platform for virtual machines 120-125. Hypervisors 130-131 abstract the components of the physical hosts to provide virtual components to virtual machines 120-125, which may include processing systems, network interfaces, or other similar computing elements. In addition to providing the virtual computing elements to the virtual machines themselves, hypervisors 130-131 may also provide software defined networking operations to provide connectivity for the virtual machines. These software defined network operations may include switching operations, routing operations, distributed firewall operations, and the like, which can be configured dynamically as required for each of the individual virtual machines.

In addition to hosts 110-111, application attach service 150 may be used to allocate and attach applications to virtual machines 120-125. In particular, in response to an attach event, which may comprise a user logging into application attach service 150, an administrator request to attach applications to a virtual machine, or some other similar attach event, application attach service 150 will identify one or more volumes associated with the request and initiate an attach process to make the applications available on the required virtual machine. For example, if an administrator requested that a productivity application group be attached to virtual machine 120, application attach service 150 may identify one or more storage volumes in application volumes 160 that contain elements for the applications, and initiate an attachment process for the applications using the volumes. This attachment process may include mounting the volumes to the virtual machine, and overlaying the elements in a file structure to permit the application to be executed on the virtual machine without a local installation on the virtual machine. These elements may include files, libraries, registry keys, and the like for the application.

While application attach service 150 is responsible for attaching applications to the virtual machines, each of the virtual machines may execute a network agent, which may comprise a service or daemon, capable of providing operation 200 further described below in FIG. 2 to identify the attachment of applications to the virtual machine and apply firewall rules based on the attachment. In applying the rules, the network agent may publish or provide the firewall rules to networking manager 140, wherein networking manager 140 may be used to apply the required firewall rules for the virtual machine. Although illustrated as part of hypervisor 130 in the present implementation, it should be understood that networking manager 140 may be distributed across hypervisors 130-131, or may reside on a computing system separate from hosts 110-111 in some implementations.

Figure 2:
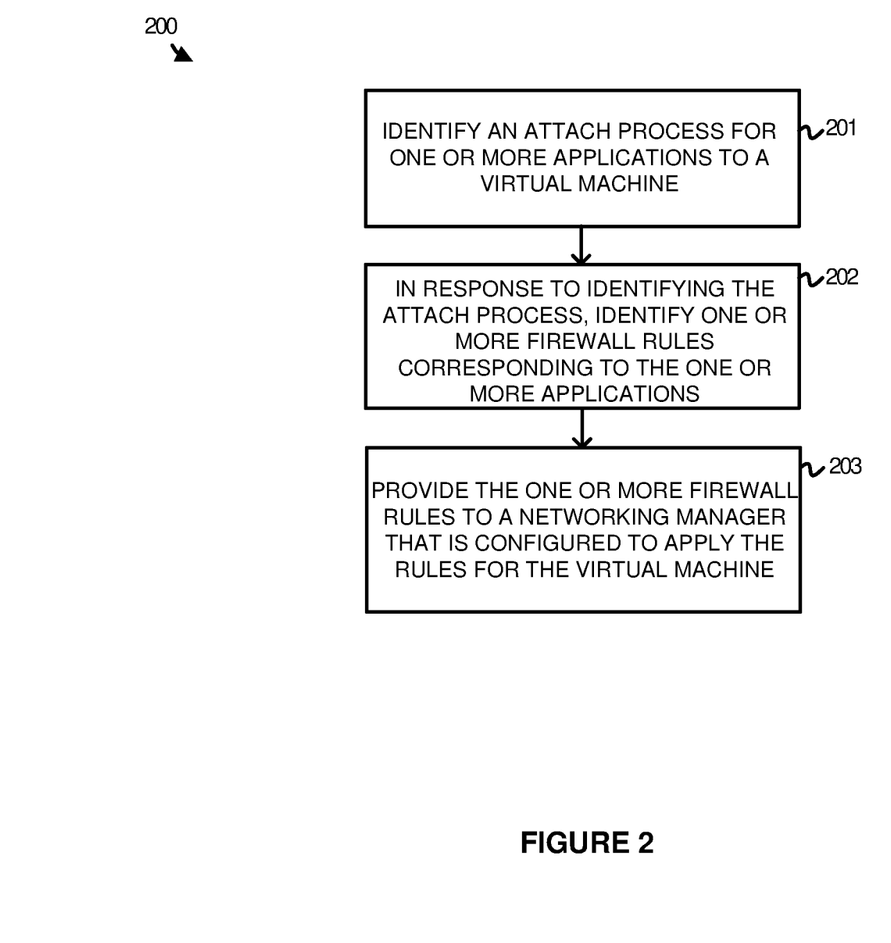
FIG. 2 illustrates an operation of a virtual machine to implement firewall rules according to an implementation.

FIG. 2 illustrates operation 200 of a virtual machine to implement firewall rules according to an implementation. The processes of operation 200 are described parenthetically in the paragraphs that follow with reference to systems and elements of computing environment 100 of FIG. 1. Although illustrated as providing operation 200 in virtual machine 120, it should be understood that similar operations may be provided by virtual machines 121-125.

As depicted, operation 200 includes identifying (201) an attach process for one or more applications to virtual machine 120. This attach process, which may be initiated by application attach service 150, may occur when a user logs into computing environment 100 and application service 150 via a remote console device, an administrator allocating one or more applications to the virtual machine, or some other attachment event. In response to the attachment event, one or more application volumes from application volumes 160 are attached or mounted to the virtual machine and the contents overlaid in the file structure to make the applications executable. As the applications are attached, operation 200 may be used to identify the addition of the one or more volumes and/or the overlaying operations for the contents of the volumes.

In response to identifying the attach process, operation 200 identifies (202) one or more firewall rules corresponding to the on the one or more applications in the one or more application volumes. For example, if a suite of productivity applications were attached to virtual machine 120, then firewall rules associated with the productivity applications may be identified by operation 200. In some implementations, the firewall rules may be stored alongside the application files, directories, and registry objects in the application volumes. Consequently, as the volumes are attached to the virtual machine, operation 200 may identify the firewall rules within the volumes for implementation. In other implementations, a repository of firewall rules may be maintained locally by virtual machine 120, such that when applications are attached, corresponding firewall rules may be identified for the attached applications.

Once the firewall rules are identified in virtual machine 120, operation 200 further includes providing (203) the one or more firewall rules to a networking manager 140 of hypervisor 130 to be implemented for the virtual machine. Although demonstrated as part of hypervisor 130 in the present implementation, it should be understood that networking manager 140 may be distributed across hypervisors 130-131, or may reside on a computing system separate from hosts 110-111 in some implementations. Once the firewall rules are provided to networking manager 140, the firewall rules may be implemented at the virtual network interface for virtual machine 120 or may be implemented at any other point in the data path between virtual machine 120 and other computing nodes. Returning to the example of the suite of productivity applications, once the rules are identified that correspond to the applications, the rules may be provided to the networking manager for implementation. This may permit communications to be allowed and/or blocked as required for the productivity applications.

In some implementations, the providing of the firewall rules to the networking manager for implementation may occur after the applications are available on the virtual machine. However, in other examples, the providing of the firewall rules to the networking manager may occur at any time after the identification of the attach process and prior to the applications becoming available for execution.

Figure 3:
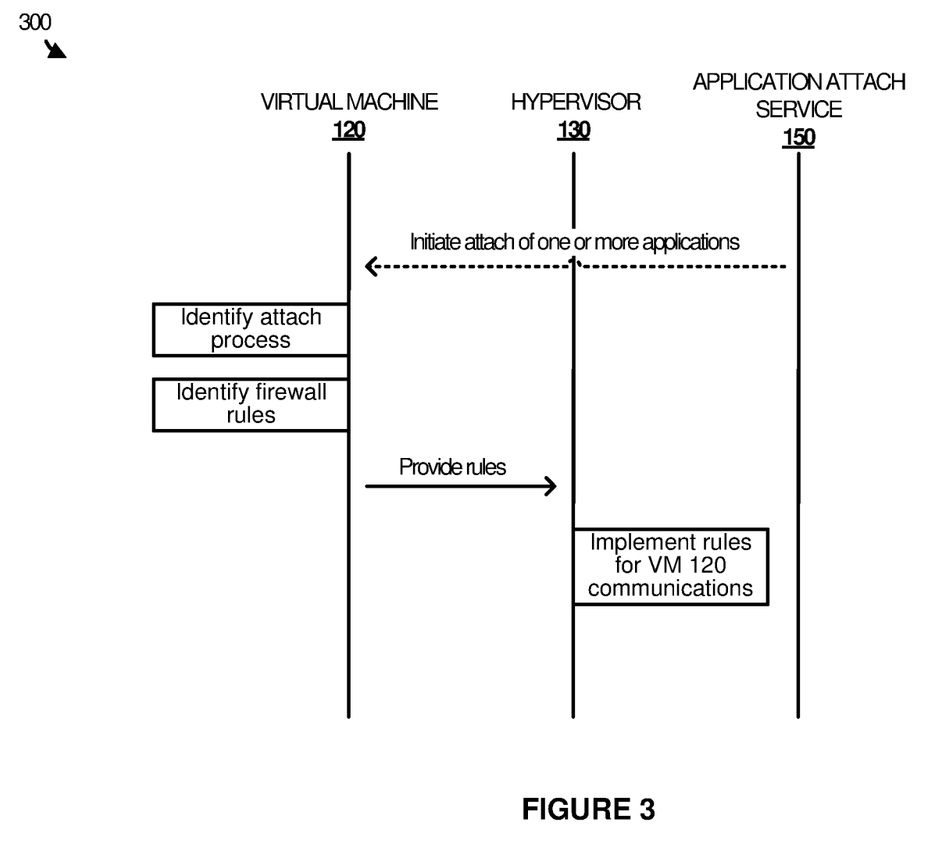
FIG. 3 illustrates a timing diagram to implement firewall rules for a virtual machine according to an implementation.

FIG. 3 illustrates a timing diagram 300 to implement firewall rules for a virtual machine according to an implementation. Timing diagram 300 includes systems and elements of computing environment 100 of FIG. 1. In particular, timing diagram 300 includes virtual machine 120, hypervisor 130, and application attach service 150.

As depicted, application attach service 150 may initiate an attach operation to make one or more applications available on virtual machine 120. This attach operation may include attaching or mounting one or more application volumes (such as VMDKs, VHDs, and the like) to the virtual machine, and overlaying contents of the volumes in the virtual machine to make the applications executable from the volumes. As the process is initiated, virtual machine 120 identifies the attach process, which may include identifying that new volumes have been mounted to the virtual machine, identifying an overlay process for the contents of the volume, or any other similar process identification. Once identified, virtual machine 120 further identifies firewall rules corresponding to the attached applications. These rules often define which services on the virtual machine are permitted to communicate with which external addresses. For example, a file sharing application may be permitted to communicate with a server to maintain information about files for the user of the virtual machine. After the rules are identified, which in some examples may be stored on the application volumes that are attached to virtual machine 120, the firewall rules are then provided to networking manager 140 of hypervisor 130, wherein the rules may be implemented for virtual machine communications. Once the rules are implemented and the applications have been made available on virtual machine 120, services for the applications may communicate with one or more external addresses to provide desired operations.

Figure 4:
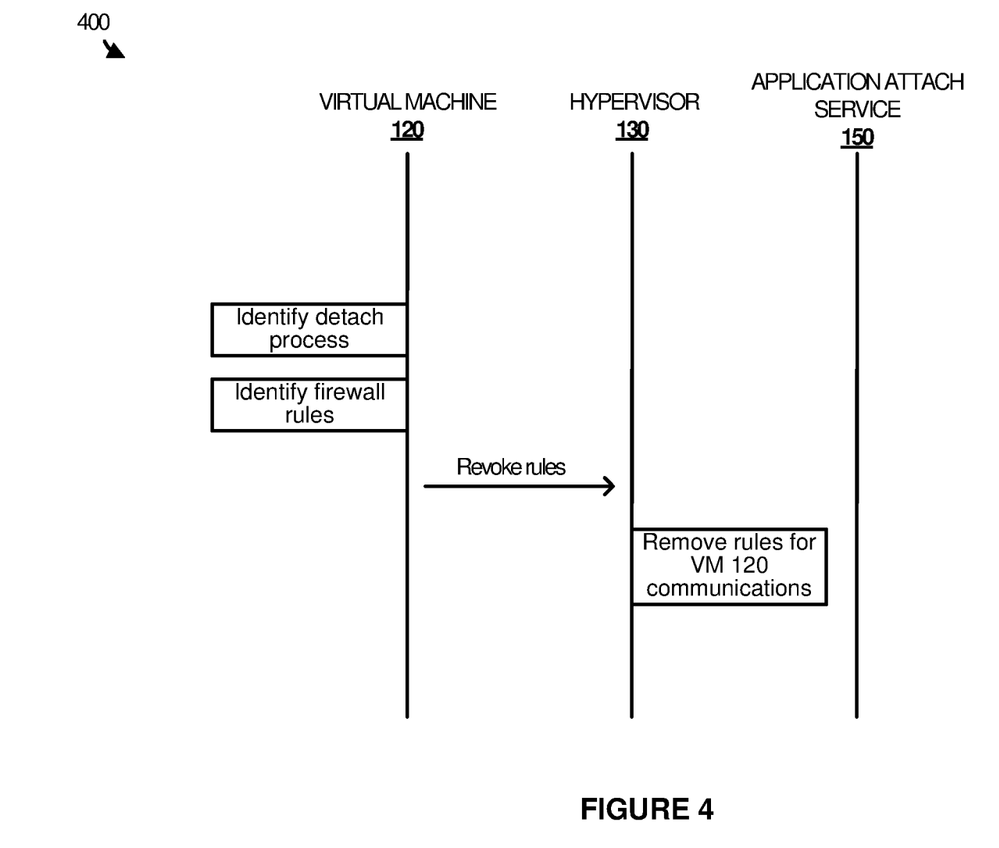
FIG. 4 illustrates a timing diagram to revoke firewall rules for a virtual machine according to an implementation.

FIG. 4 illustrates a timing diagram 400 to revoke firewall rules for a virtual machine according to an implementation. Timing diagram 400 includes systems and elements of computing environment 100 of FIG. 1. In particular, timing diagram 400 includes virtual machine 120, hypervisor 130, and application attach service 150.

As previously demonstrated in FIG. 3, when applications are attached to virtual machine 120, firewall rules may be implemented to support the operations of the applications. Additionally, as demonstrated in FIG. 4, the firewall rules may be revoked when applications are detached from a virtual machine, wherein detachment may remove application components from the file structure of the virtual machine and detach the volume from the virtual machine. In revoking the rules, the network agent executing on virtual machine 120 identifies a detach process for one or more applications. This detach process may occur when a user logs out of the virtual machine, may occur based on an administrator request to detach an application, or may occur based on any other event. Once the detachment process is identified, virtual machine 120, will identify firewall rules associated with the applications that are being detached. For example, if a suite of productivity applications were detached from virtual machine 120, any firewall rule that corresponded to the applications would be identified for removal. After the rules are identified, virtual machine 120 may communicate a revoke rules notification to networking manager 140 executing as part of hypervisor 130 that indicates the rules to be revoked. Responsively, hypervisor 130 may remove the rules to prevent future communications that correspond to the detaching applications.

Figure 5:
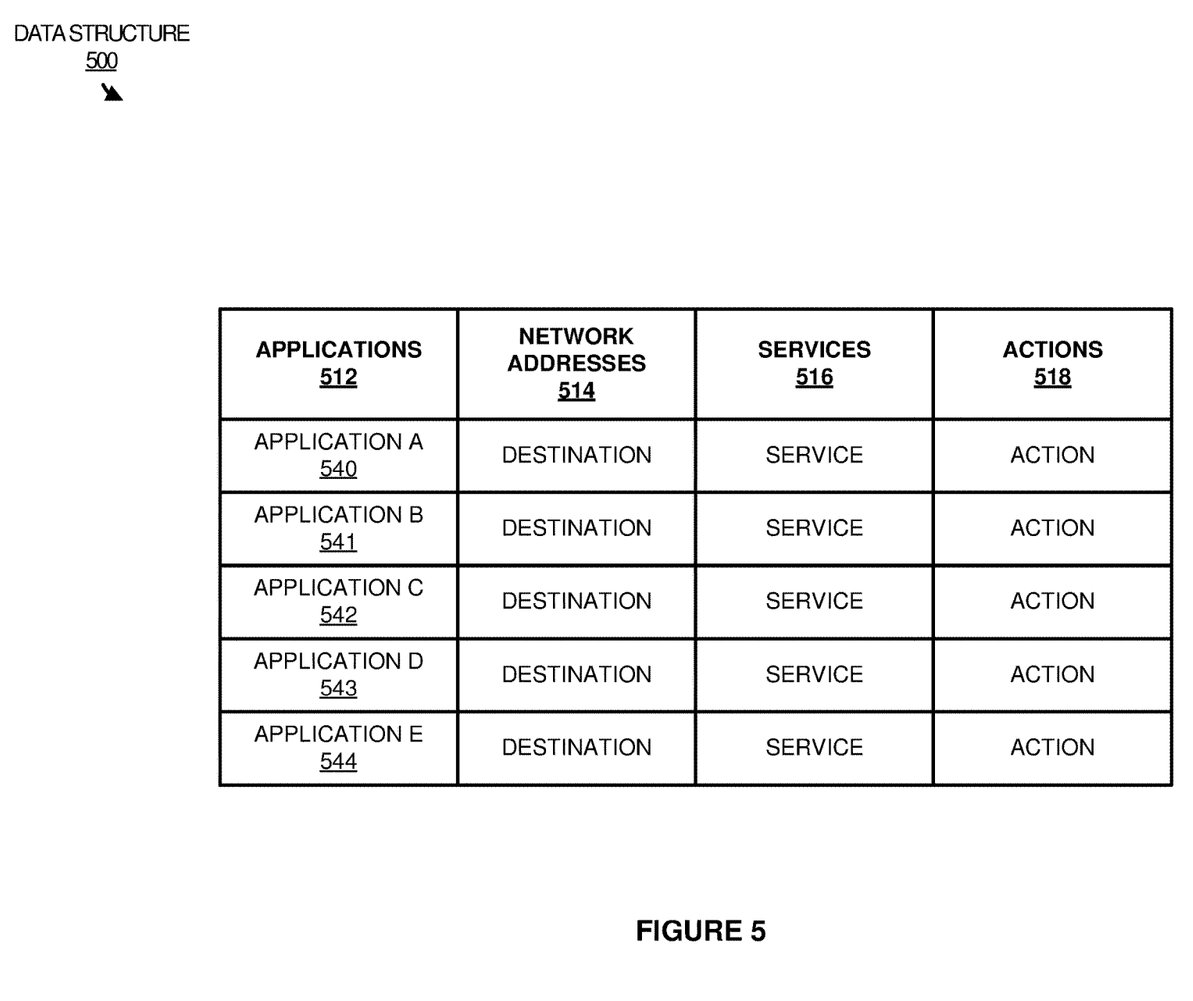
FIG. 5 illustrates a data structure for firewall rules according to an implementation.

FIG. 5 illustrates a data structure 500 for firewall rules according to an implementation. Data structure 500 includes columns for applications 512, network addresses 514, services 516, and actions 518. Application column 512 includes applications 540-544, which are representative of applications that may be attached to a virtual machine using one or more storage volumes. Data structure 500 is representative of a rule set that may be applied for a single application group or stack, such as a productivity suite of applications.

In operation, responsive to a user login or administrator allocation, one or more applications may be attached to a virtual machine. To provide firewall operations for the virtual machine, a network agent executing within the virtual machine may identify the attach operation, determine one or more firewall rules to support the application, and provide the firewall rules to a networking manager for the virtual machine. In some implementations, to determine the firewall rules, the network agent may identify the rules that are stored on the attached application volumes. In other implementations, the rules may be stored locally at the virtual machine, and the virtual machine may identify the rules based on the applications that were attached. In the present example, rules are defined for applications 540-544, which, once identified, can be provided to the networking manager. The networking manager may execute locally on the same host as the virtual machine, or may execute on a separate host computing system in some examples. Once provided, the rules may be implemented at the virtual network interface or at some other point in the data path for the virtual machine. In particular, when a communication is detected for the virtual machine, a network address and service may be identified and compared to information in columns for network addresses 514 and services 516. When a rule is identified that matches the network address and service, the appropriate action in actions column 518 may be applied.

In some implementations, the virtual machines within a computing environment may initially be configured to prevent communications from application services on the virtual machine. For example, for the productivity application suite, the virtual machine may initially be configured to block all communications associated with services for the suite. Once the applications are attached to the virtual machine, the services may be permitted to communicate with one or more external systems.

Figure 6:
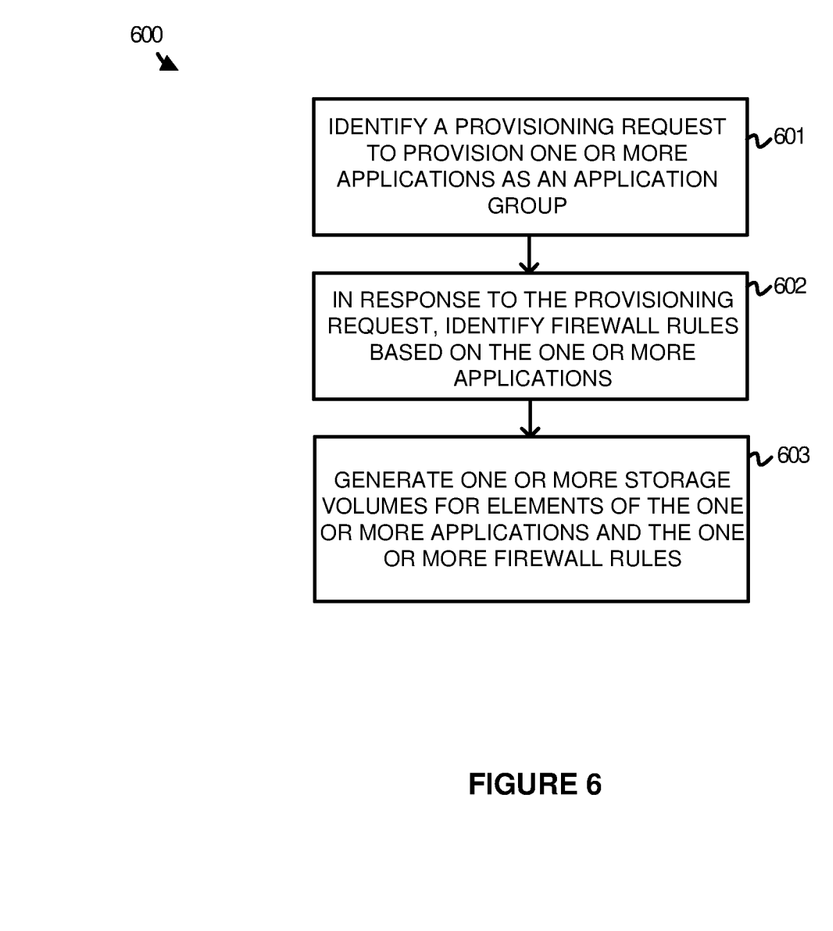
FIG. 6 illustrates an operation of a virtual machine to generate firewall rules for an application group according to an implementation.

FIG. 6 illustrates an operation 600 of a virtual machine to generate firewall rules for an application group according to an implementation. The processes of operation 600 are described parenthetically in the paragraphs that follow.

As depicted in operation 600, a virtual machine may be configured to identify (601) a provisioning request to provision one or more applications as an application group. For example, an administrator of a computing environment may desire to generate one or more application storage volumes to store a suite of applications. This may include installing the applications by extracting the files, directories, and registry keys and placing the files, directories, and registry keys in one or more storage volumes. Once installed in the storage volumes, the volumes may be attached to virtual machines to make the applications executable by the virtual machines without requiring a local installation.

Here, in addition to provisioning the volumes for the applications, operation 600 further directs the virtual machine to, in response to the provisioning request, identify (602) firewall rules based on the one or more applications. To identify the firewall rules, the virtual machine may employ a variety of operations. In one implementation, once the applications are installed and available for execution, the applications may be initiated to determine the services that require communication with external systems. As a service requires a communication, a firewall rule may be generated that defines the service, the external address, and the action to be taken when a communication is identified (permit/block). In some examples, the applications may be started automatically, however, it should be understood that a user or administrator may be required to initiate the application in some examples. In other implementations, in addition to or in place of the automated creation of the firewall rules, the virtual machine may identify common firewall rules that apply to common applications, such as a web browser. Once the common rules are identified, additional rules may be added or a portion of the rules may be removed based on user input. Thus, if a rule was not considered to be a common rule, then additional rules may be added as required by the user or administrator that is generating the application volumes.

As the rules are identified for the applications, operation 600 generates (603) one or more storage volumes that includes elements of the one or more applications and the one or more firewall rules. In some examples, the application elements (files, directories, keys, etc.) may be stored alongside a firewall rule package that can be identified by a virtual machine when the application volumes are attached. Accordingly, the firewall rule package may be used to update the firewall rules for the virtual machine.

Figure 7:
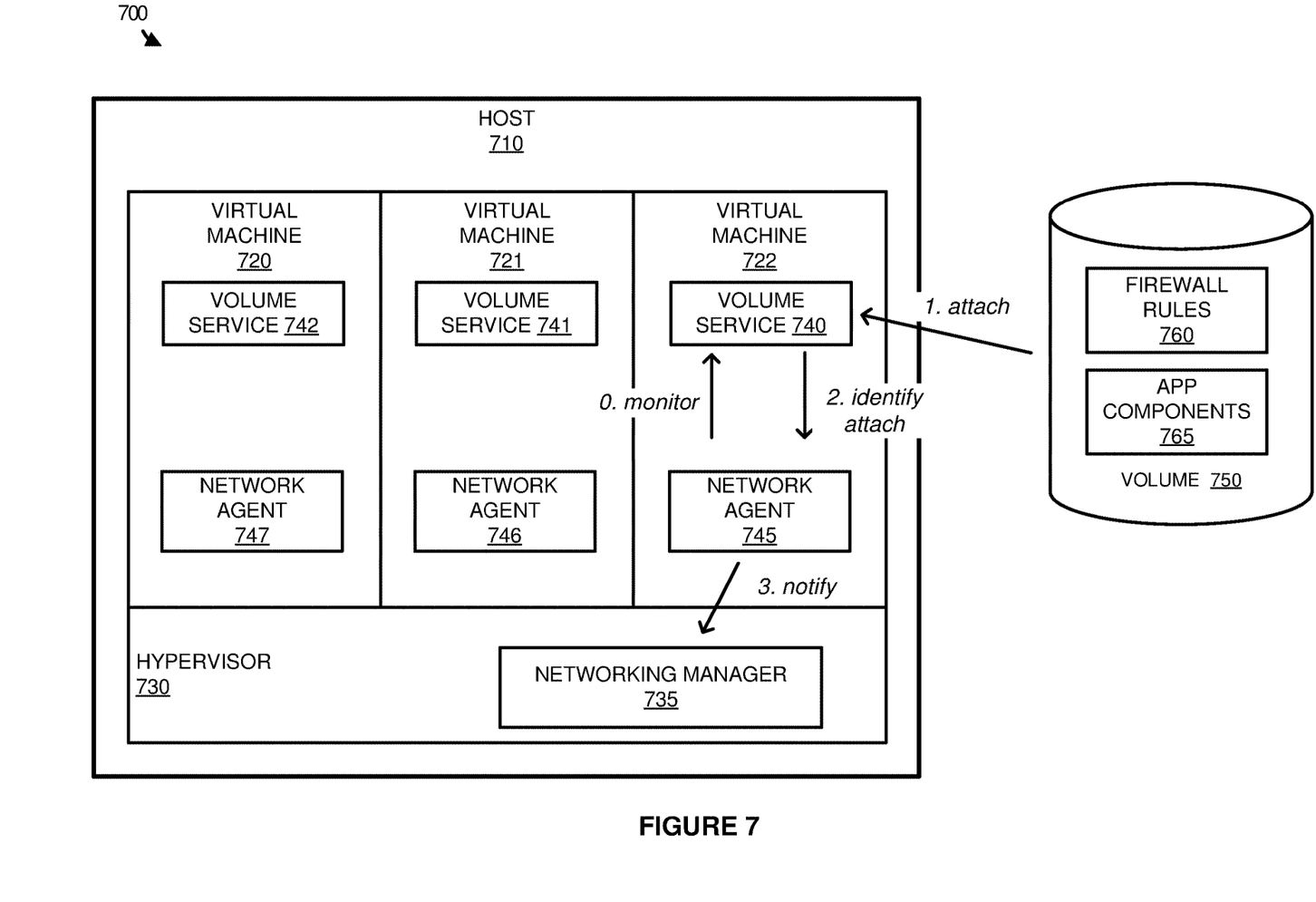
FIG. 7 illustrates an operational scenario of attaching an application volume to a virtual machine according to an implementation.

FIG. 7 illustrates an operational scenario 700 of attaching an application volume to a virtual machine according to an implementation. Operational scenario 700 includes host 710 and volume 750. Host 710 further includes hypervisor 730 and virtual machines 720-722 with volume services 740-742 and network agents 745-747. Volume 750 includes firewall rules 760 and application components 765. Hypervisor 730 further includes networking manager 735 that applies firewall rules provided by virtual machines.

In operation, network agent 745 monitors, at step 0, volume service 740 to determine when applications are attached to virtual machine 722. During the monitoring operation, volume 750 is attached, at step 1, to virtual machine 722. This attachment may include mounting volume 750 to virtual machine 722 using hypervisor 730, and overlaying application components 765 within the file structure of the virtual machine using volume service 740 to make the application executable on the virtual machine. The attachment may be triggered by a user login to virtual machine 722, may be triggered via an administrator request to attach the volumes, or may be triggered by any other similar manner. As the attach process occurs, network agent 745 may identify, at step 2, the attachment of the application volume based on the monitoring of volume service 740. In some implementations, the monitoring may be periodic, however, it should be understood that the monitoring may occur at any other interval. Further, while demonstrated as requiring network agent 745 to request and receive attach information, it should be understood that volume service 740 may provide attach operation information without a request from the network agent.

After identifying that an attach has occurred, network agent 745 further determines one or more firewall rules to support the attached applications. In the present implementation, firewall rules 760 are included in volume 750. Consequently, network agent 745 may retrieve the required rules and notify, at step 3, networking manager 735 executing as part of hypervisor 730 to implement the required rules. Once notified, networking manager 735 may update the firewall for virtual machine 722 to reflect the new rules. This implementation may occur at the virtual network interface for the virtual machine, or at any other location in the data path for communications to and from virtual machine 722.

Although demonstrated in the example of operational scenario 700 as executing within hypervisor 730, it should be understood that networking manager 735 may execute on a separate computing system or may execute across a plurality of computing systems. For example, networking manager 735 may execute on a computing system that manages firewall rules for virtual machines across a plurality of host computing systems. Further, while demonstrated as a single application volume being attached to the virtual machine, it should be understood that any number of volumes may be attached to a virtual machine to provide the required applications.

Figure 8:
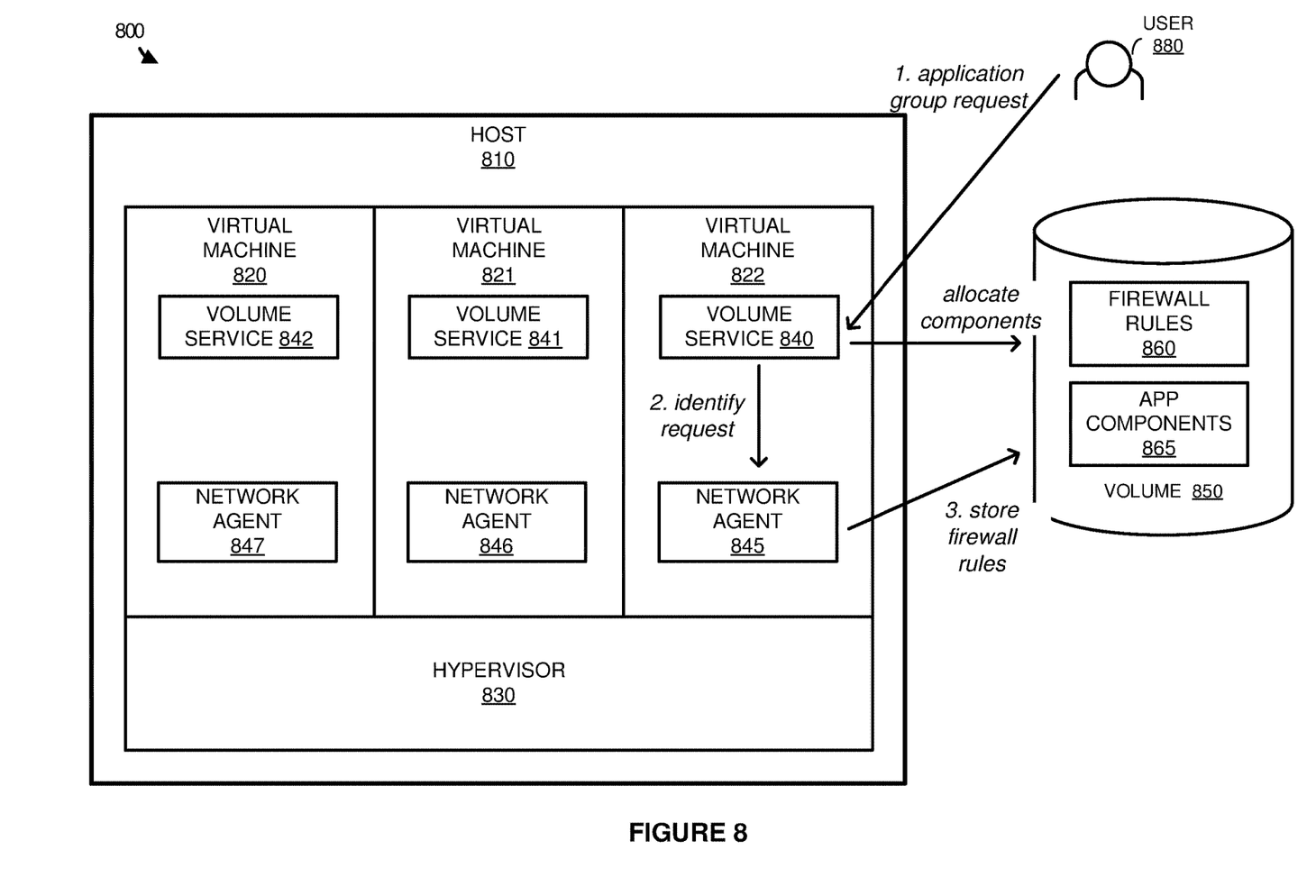
FIG. 8 illustrates an operational scenario of generating an application volume according to an implementation.

FIG. 8 illustrates an operational scenario 800 of generating an application volume according to an implementation. Operational scenario 800 includes host 810, volume 850, and user 880. Host 810 further includes hypervisor 830 and virtual machines 820-822 with volume services 840-842 and network agents 845-847. Volume 850 includes firewall rules 860 and application components 865.

In operation, user 880 may use virtual machine 822 to generate application volumes, such as volume 850, to be attached to one or more virtual machines in a computing environment. In particular, at step 1, user 880 may provide an application group request to generate one or more application storage volumes. This request may include installing the applications by extracting and storing files, directories, and registry objects as application components 865 in volume 850. In addition to allocating the components to volume 850, network agent 845 executing within virtual machine 822 may be responsible for identifying, at step 2, the generation request. In response to identifying the request, network agent 845 will identify one or more firewall rules associated with the applications and store, at step 3, the firewall rules in volume 850 with the application components.

In some implementations, to identify the application group request, network agent 845 may monitor volume service 840 that is responsible for generating the application volume. This monitoring may include providing requests to volume service 840, or may rely on volume service 840 to communicate a notification when an application group is created. In some examples, to identify the firewall rules for the application, network agent 845 may execute the applications of the application group. For example, if a suite of productivity applications were installed, each of the productivity applications may be initiated to determine which services require communications with which external addresses. Based on this information, firewall rules may be generated that correspond to the identified communications. In some implementations, in addition to or in place of the execution of the applications, the firewall rules may be generated at least in part on user defined firewall rules for the applications and/or frequently used firewall rules for applications such as web browsers and other similar applications.

Once firewall rules 860 have been added to volume 850 with application components 865, volume 850 may be stored in a repository, such that it may be attached to one or more virtual machines in a computing network. In particular, a hypervisor for the virtual machines may mount volume 850 to a virtual machine, and a volume service may make application components 865 available for execution on the virtual machine. Additionally, a network agent for the virtual machine may identify the firewall rules within volume 850 and provide the firewall rules to the hypervisor or some other networking manager.

Although illustrated in the present example as storing the application components and the firewall rules within a single application volume, it should be understood that the applications may be stored in any number of volumes to create the application group. Further, while demonstrated as storing the firewall rules with the application, it should be understood that the firewall rules may be distributed to network agents within a computing environment. Accordingly, based on the applications (or application volumes) that are attached to a virtual machine, the firewall rules may be identified and provided to the networking manager as required.

Despite being illustrated as part of the same operation, it should be understood that the generation of the firewall rules may occur subsequent to the operations that install the application group in the storage volumes. For example, a first operation may be used to identify a request to make an application volume and perform the required steps to store the application components in the storage volume. Once installed, the rules may be identified using any of the aforementioned operations including executing the applications, generating rules based on commonly required rules, receiving user generated rules, or some other similar operation. Once the rules are defined the rules may be stored with the application group in the one or more storage volumes.

Figure 9:
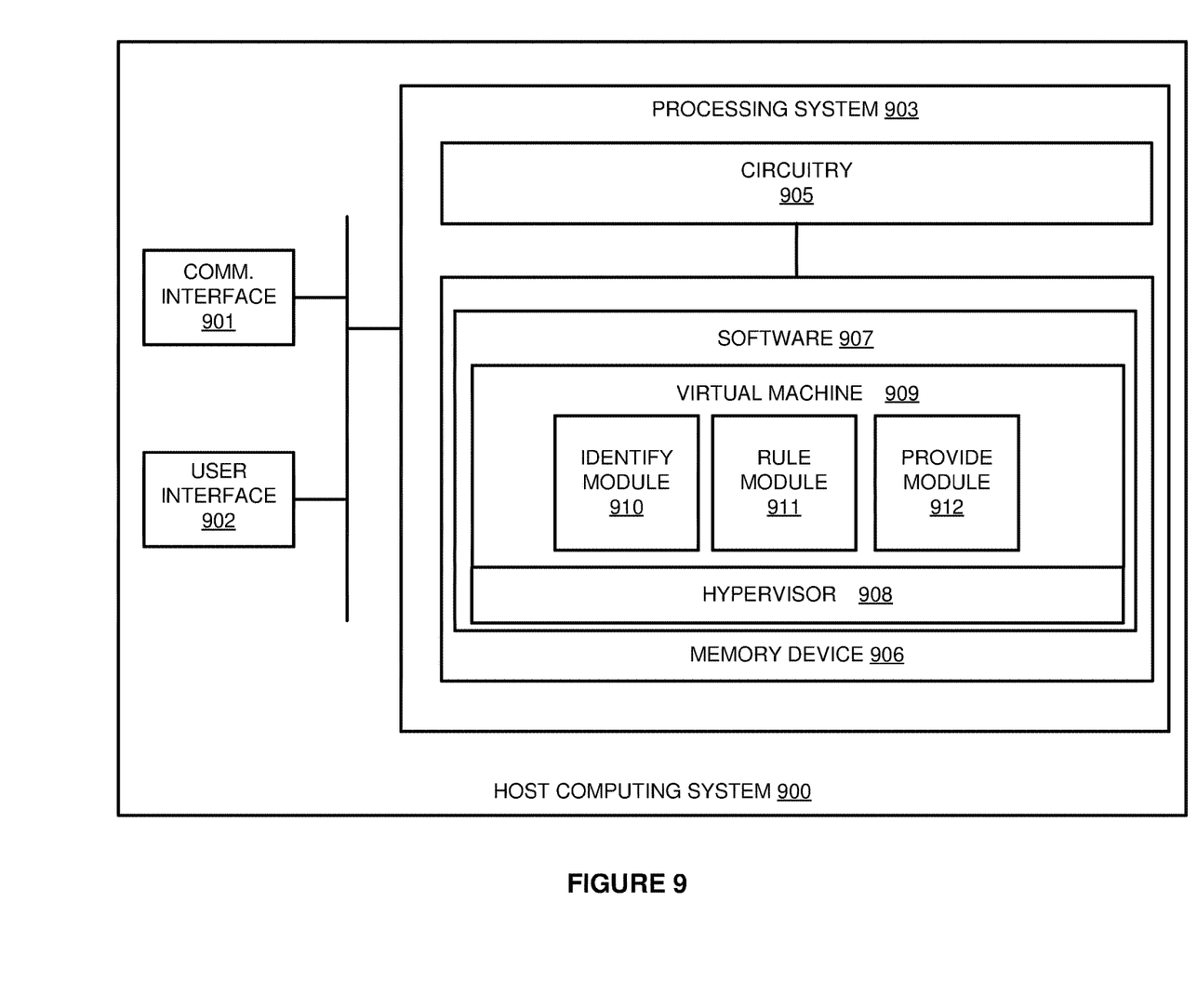
FIG. 9 illustrates a host computing system according to an implementation.

FIG. 9 illustrates a host computing system 900 according to an implementation. Computing system 900 is representative of any computing system or systems with which the various operational architectures, processes, scenarios, and sequences disclosed herein for a host computing system may be implemented. Computing system 900 is an example of host from FIGS. 1-8 although other examples may exist. Computing system 900 comprises communication interface 901, user interface 902, and processing system 903. Processing system 903 is linked to communication interface 901 and user interface 902. Processing system 903 includes processing circuitry 905 and memory device 906 that stores operating software 907. Computing system 900 may include other well-known components such as a battery and enclosure that are not shown for clarity. Computing system 900 may comprise a serving computing system, a desktop computing system, or some other type of computing system.

Communication interface 901 comprises components that communicate over communication links, such as network cards, ports, radio frequency (RF), processing circuitry and software, or some other communication devices. Communication interface 901 may be configured to communicate over metallic, wireless, or optical links. Communication interface 901 may be configured to use Time Division Multiplex (TDM), Internet Protocol (IP), Ethernet, optical networking, wireless protocols, communication signaling, or some other communication format—including combinations thereof. In some implementations, communication interface 901 may be configured to communicate with an application attach service to obtain requests to attach one or more application volumes to virtual machines executing on host computing system 900. In some examples, communication interface 901 may be configured to communicate with one or more storage systems or computing devices that serve as a repository for the application storage volumes.

User interface 902 comprises components that interact with a user to receive user inputs and to present media and/or information. User interface 902 may include a speaker, microphone, buttons, lights, display screen, touch screen, touch pad, scroll wheel, communication port, or some other user input/output apparatus—including combinations thereof. User interface 902 may be omitted in some implementations.

Processing circuitry 905 comprises microprocessor and other circuitry that retrieves and executes operating software 907 from memory device 906. Memory device 906 may include volatile and nonvolatile, removable and non-removable media implemented in any method or technology for storage of information, such as computer readable instructions, data structures, program modules, or other data. Memory device 906 may be implemented as a single storage device, but may also be implemented across multiple storage devices or sub-systems. Memory device 906 may comprise additional elements, such as a controller to read operating software 907. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing circuitry 905 is typically mounted on a circuit board that may also hold memory device 906 and portions of communication interface 901 and user interface 902. Operating software 907 comprises computer programs, firmware, or some other form of machine-readable program instructions. Operating software 907 includes hypervisor 908, which provides a platform for virtual machine 909 and software modules 910-912, although any number of software modules may provide similar operations. Operating software 907 may further include an operating system, utilities, drivers, network interfaces, applications, or some other type of software. When executed by processing circuitry 905, operating software 907 directs processing system 903 to operate computing system 900 as described herein.

In operation, hypervisor 908 executes on host computing system 900 to abstract the physical components of host and provide the abstracted components to virtual machine 909. These components include processing resources, memory resources, network resources, and other similar virtual hardware components. During the execution of the virtual machine, one or more storage volumes may be attached to the virtual machine to make applications stored on the storage volumes executable without local installation on the virtual machine. This attachment process may include attaching or mounting the storage volumes to virtual machine 909 and overlaying the files, directories, registry keys, and the like for the applications within a file structure for the virtual machine. During the application attach process, identify module 910 directs processing system 903 to identify that an attachment of one or more applications is occurring on the virtual machine. In response to identifying an attach process for one or more applications, rule module 911 directs processing system 903 to determine one or more firewall rules that correspond to the applications, and once identified, provide module 912 may direct processing system 903 to provide the one or more firewall rules to a networking manager for implementation. This networking manager may execute locally on host computing system 900, such as part of hypervisor 908, may be distributed across multiple host computing systems in a computing environment, or may be executed on a separate physical computing system from host computing system 900.

In some implementations, the firewall rules may be stored with the one or more applications on the attached storage volumes. In other implementations, a set of rules may be stored locally at the virtual machines and the rules may be provided to a networking manager based on the identities of the attached applications.

Although not illustrated in the present example, it should be understood that software modules on virtual machine 909 may be used in storing firewall rules with the applications as application volumes are generated. In particular, software modules may direct processing system 903 to identify a request to generate an application group with one or more applications. Once identified, the software modules may determine what firewall rules should be associated with the new applications and store the firewall rules with the application components on a storage volume. In determining the firewall rules, the rules may be determined based on executing the applications as they are installed to identify services and the required associated end destinations, may be determined based on user input, may be determined based on common firewall rules for other application groups, or may be determined in any other manner.

Returning to the elements of FIG. 1, application attach service 150 may comprise communication interfaces, network interfaces, processing systems, computer systems, microprocessors, storage systems, storage media, or some other processing devices or software systems, and can be distributed among multiple devices. Examples of application attach service 150 can include software such as an operating system, logs, databases, utilities, drivers, natural language processing software, networking software, and other software stored on a computer-readable medium. Application attach service 150 may comprise, in some examples, one or more server computing systems, desktop computing systems, laptop computing systems, or any other computing system, including combinations thereof.

Hosts 110-111 may each comprise communication interfaces, network interfaces, processing systems, computer systems, microprocessors, storage systems, storage media, or some other processing devices or software systems, and can be distributed among multiple devices. Hosts 110-111 can each include software such as an operating system, logs, databases, utilities, drivers, natural language processing software, networking software, and other software stored on a computer-readable medium. Hosts 110-111 may each comprise a serving computing system, a desktop computing system, or some other similar computing system.

Application volumes 160 may reside on any computing system or systems that can include communication interfaces, network interfaces, processing systems, computer systems, microprocessors, storage systems, storage media, or some other processing devices or software systems, and can be distributed among multiple devices. Application volumes 160 may be located on one or more server computing systems, desktop computing systems, laptop computing systems, or any other computing system, including combinations thereof. Although illustrated separate from hosts 110-111, it should be understood that application volumes 160 may be stored locally on hosts 110-111 in some implementations.

Communication between application attach service 110, hosts 110-111, and application volumes 160 may use metal, glass, optical, air, space, or some other material as the transport media. Communication between application attach service 110, hosts 110-111, and application volumes 160 may use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication between application attach service 110, hosts 110-111, and application volumes 160 may be a direct link or can include intermediate networks, systems, or devices, and can include a logical network link transported over multiple physical links.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of managing one or more firewall rules for a virtual machine in a computing environment, the method comprising:
   identifying, in the virtual machine, an attach process to make one or more applications available for execution on the virtual machine;
   in response to identifying the attach process and in the virtual machine, identifying the one or more firewall rules corresponding to the one or more applications; and
   in the virtual machine, providing the one or more firewall rules to a networking manager outside of the virtual machine that is configured to apply the one or more firewall rules for the virtual machine.

2. The method of claim 1, wherein the attach process comprises mounting one or more storage volumes to the virtual machine and overlaying elements of the one or more storage volumes in the virtual machine to make the one or more applications executable on the virtual machine from the one or more storage volumes.

3. The method of claim 2, wherein identifying the one or more firewall rules comprises identifying the one or more firewall rules in the one or more storage volumes.

4. The method of claim 2, wherein the one or more storage volumes comprise one or more virtual disks.

5. The method of claim 1 further comprising, in the virtual machine:
   identifying a detach process for the one or more applications;
   in response to identifying the detach process, identifying the one or more firewall rules associated with the one or more applications; and
   providing a notification to the networking manager for the virtual machine to revoke the one or more firewall rules for the virtual machine.

6. The method of claim 1, wherein each of the one or more firewall rules comprise a network address, a service, and an associated action.

7. The method of claim 6, wherein the associated action comprises one of a permit or block action.

8. The method of claim 1, wherein the networking manager executes as part of a hypervisor for the virtual machine.

9. A computing apparatus comprising:
   one or more non-transitory computer readable storage media;
   a processing system operatively coupled to the one or more non-transitory computer readable storage media; and
   program instructions stored on the one or more non-transitory computer readable storage media to manage one or more firewall rules for a virtual machine in a computing environment that, when read and executed by the processing system, direct the processing system to at least:
      identify, in the virtual machine, an attach process to make one or more applications available for execution on the virtual machine;
      in response to identifying the attach process and in the virtual machine, identify the one or more firewall rules corresponding to the one or more applications; and
      in the virtual machine, provide the one or more firewall rules to a networking manager outside of the virtual machine that is configured to apply the one or more firewall rules for the virtual machine.

10. The computing apparatus of claim 9, wherein the attach process comprises mounting one or more storage volumes to the virtual machine and overlaying elements of the one or more storage volumes in the virtual machine to make the one or more applications executable on the virtual machine from the one or more storage volumes.

11. The computing apparatus of claim 10, wherein the program instructions to identify the one or more firewall rules direct the processing system to identify the one or more firewall rules in the one or more storage volumes.

12. The computing apparatus of claim 10, wherein the one or more storage volumes comprise one or more virtual disks.

13. The computing apparatus of claim 9, wherein the program instructions further direct the processing system to:
   identify, in the virtual machine, a detach process for the one or more applications;
   in response to identifying the detach process, identify the one or more firewall rules associated with the one or more applications; and
   provide a notification to the networking manager for the virtual machine to revoke the one or more firewall rules for the virtual machine.

14. The computing apparatus of claim 9, wherein each of the one or more firewall rules comprise a network address, a service, and an associated action.

15. The computing apparatus of claim 14, wherein the associated action comprises one of a permit or block action.

16. The computing apparatus of claim 9, wherein the networking manager executes as part of a hypervisor for the virtual machine.

* * * * *